Patented May 6, 1930

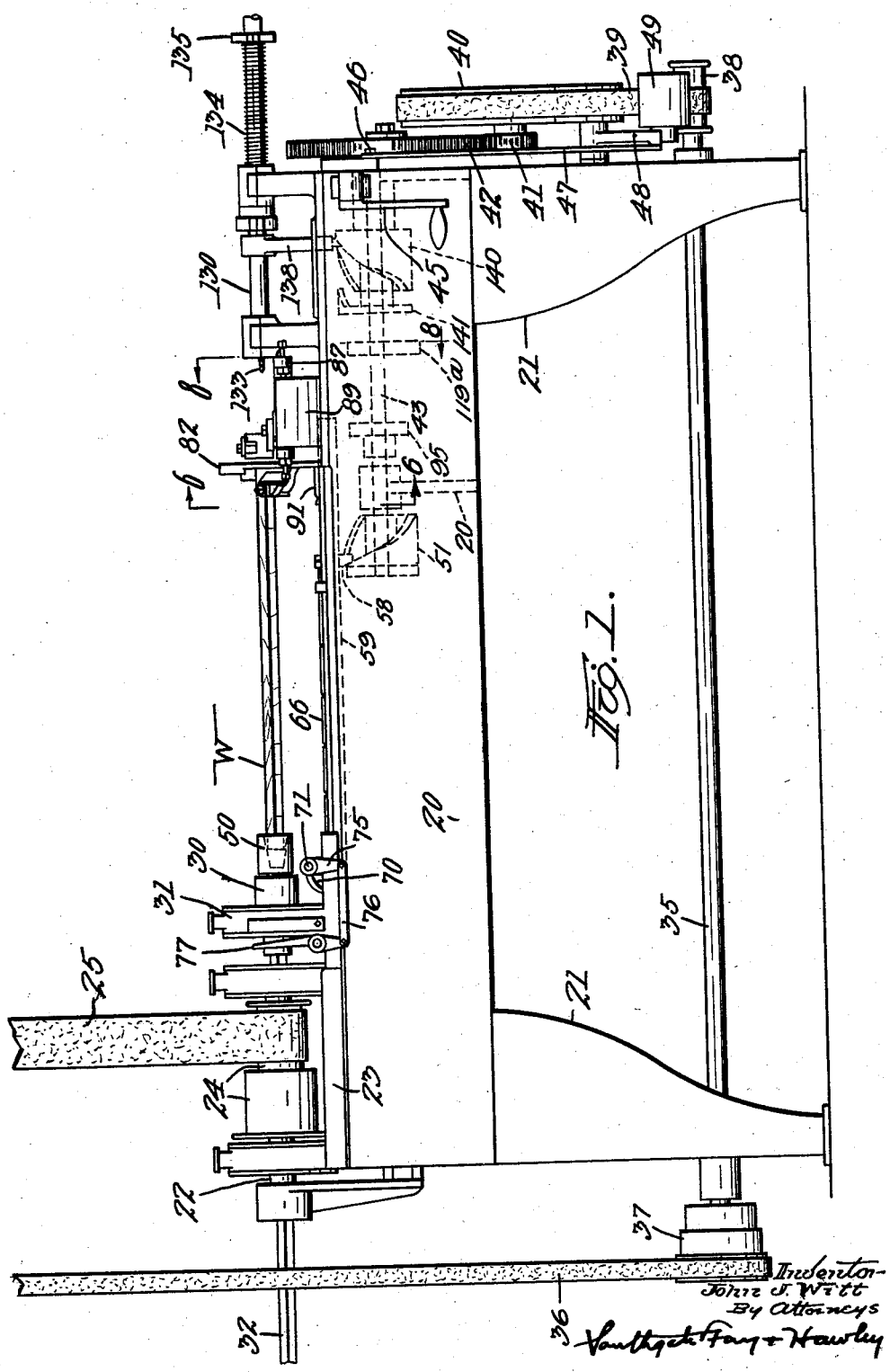

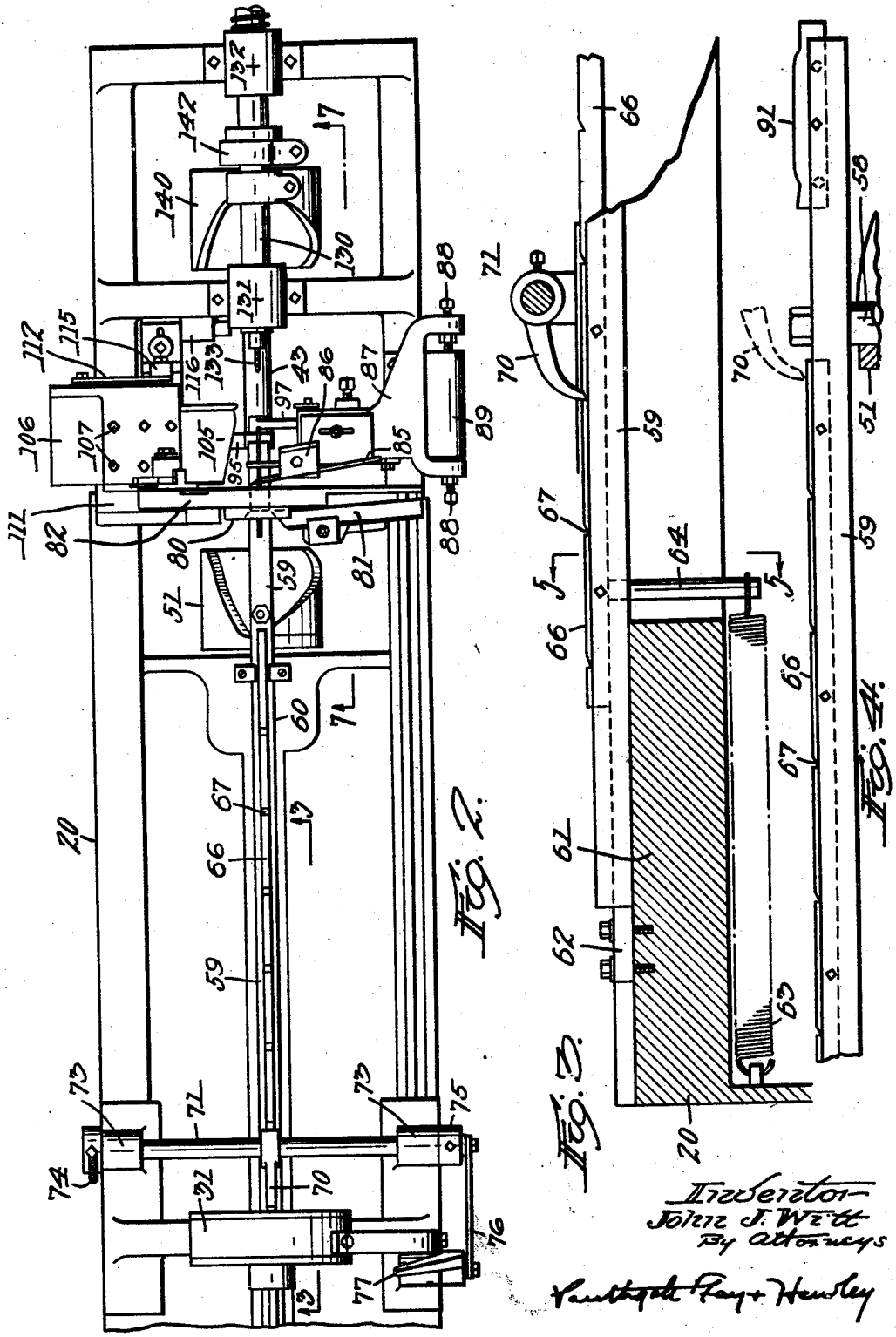

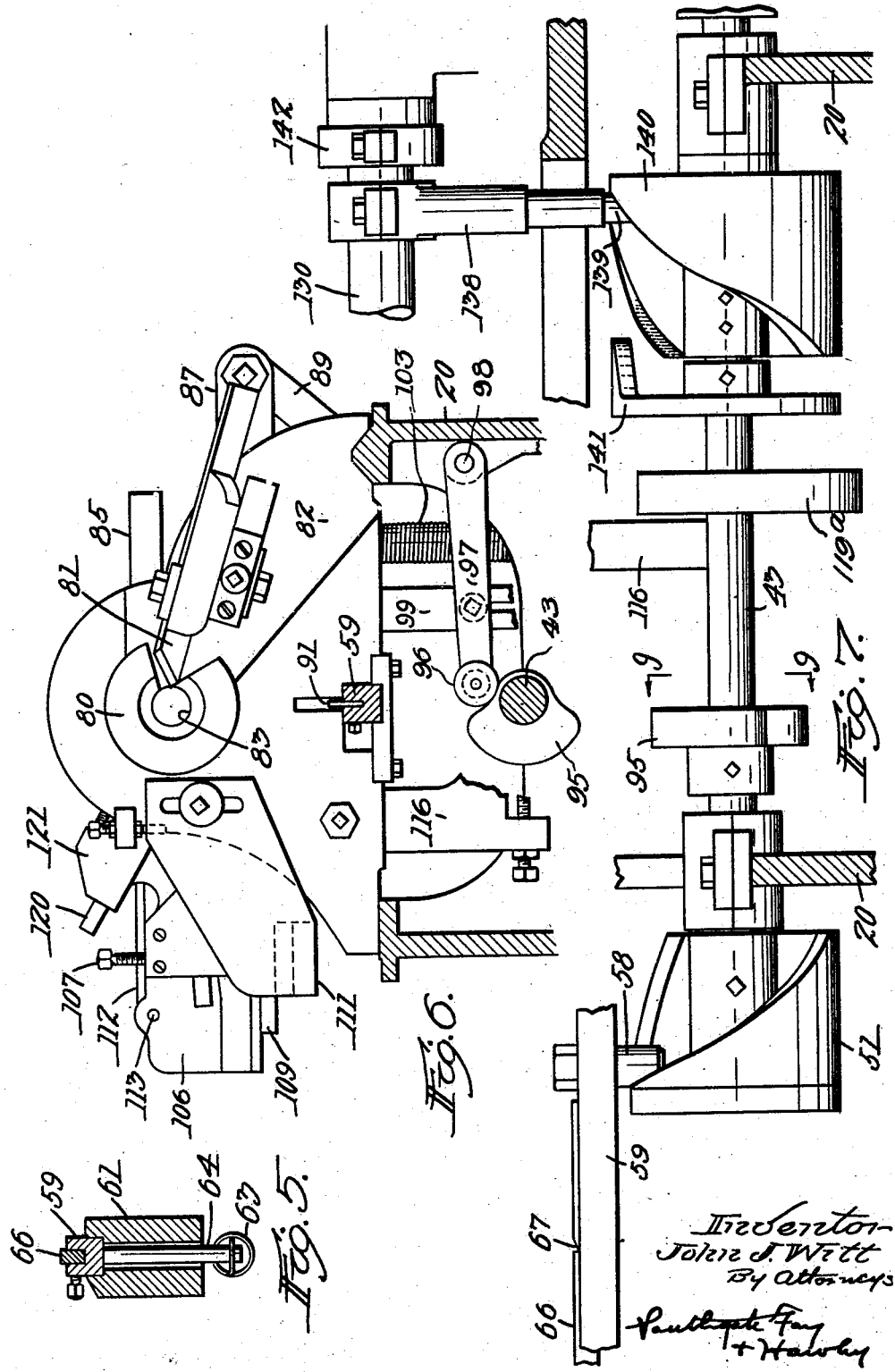

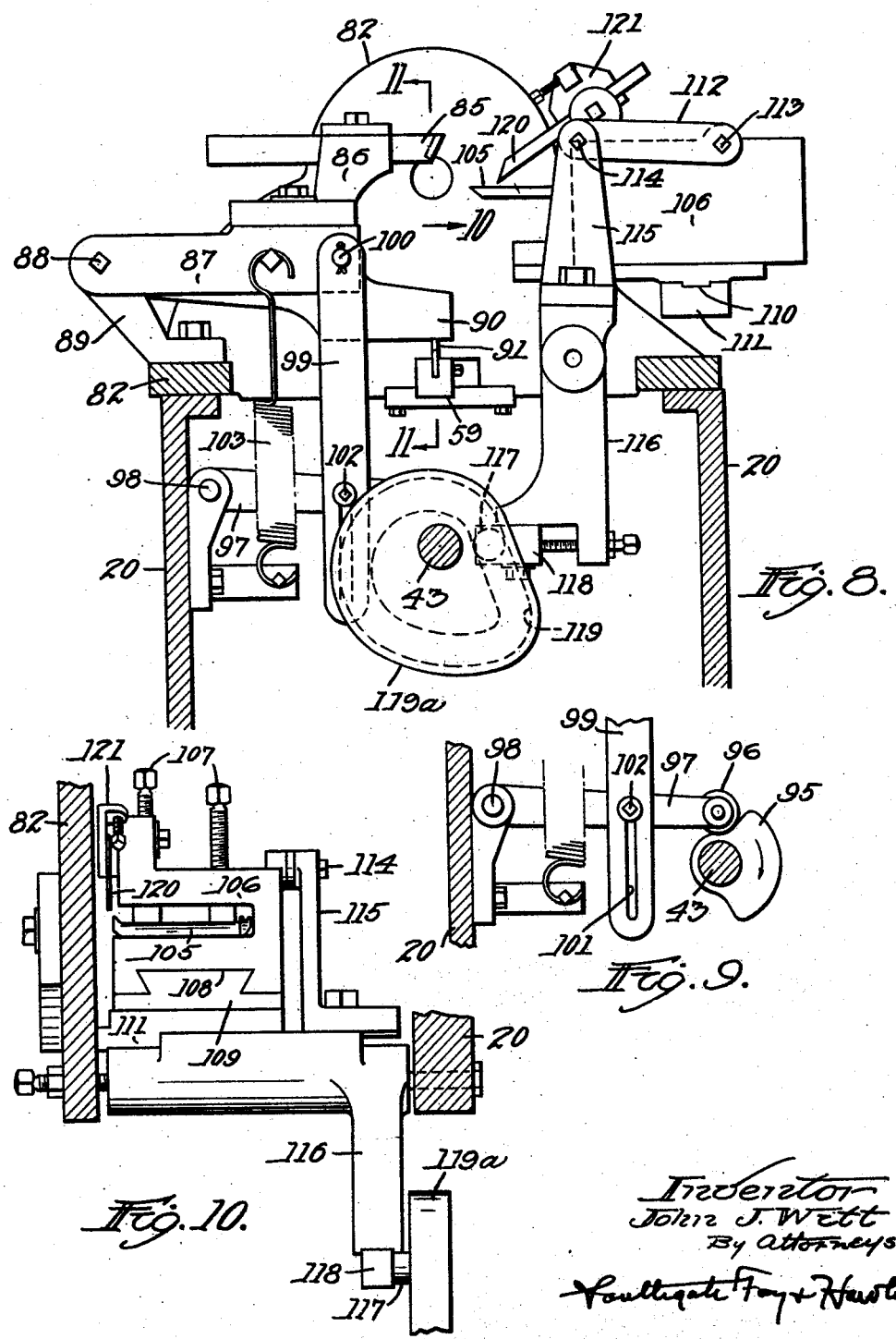

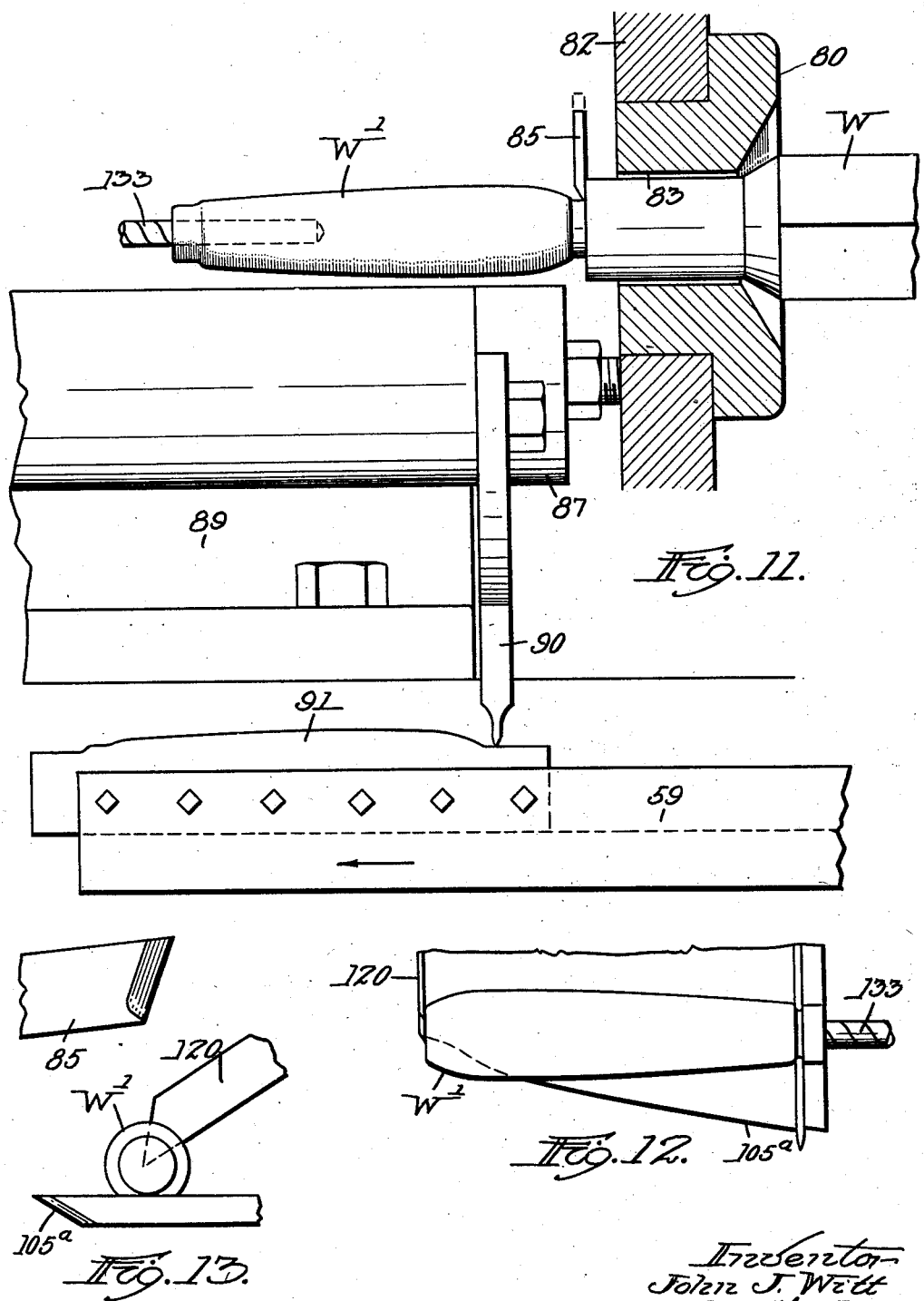

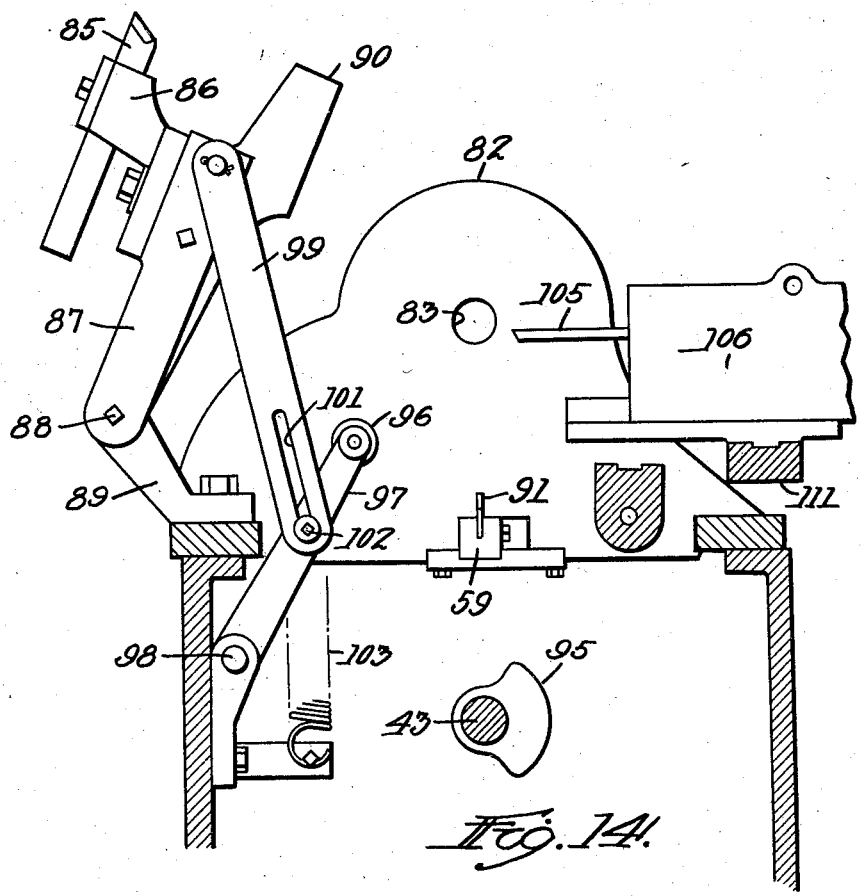
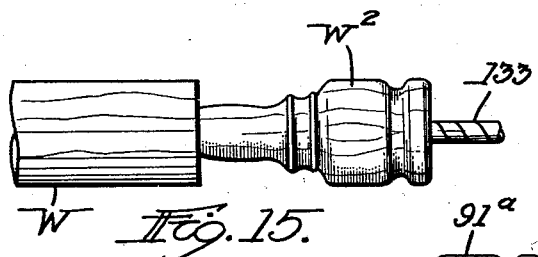
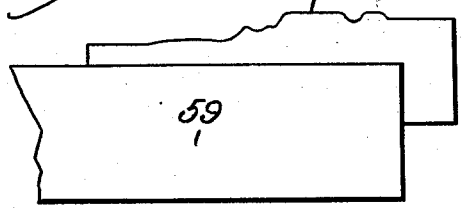
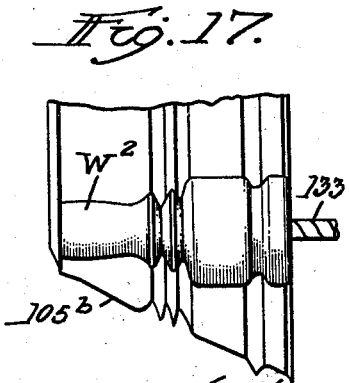

1,757,155

UNITED STATES PATENT OFFICE

JOHN J. WITT, OF WINCHENDON, MASSACHUSETTS, ASSIGNOR TO GOODSPEED MACHINE COMPANY, OF WINCHENDON, MASSACHUSETTS, A CORPORATION OF MASSACHUSETTS

VARIETY LATHE

Application filed December 27, 1927. Serial No. 242,770.

This invention relates to a variety lathe used for turning handles, knobs, spindles, or other similar articles which are to be produced in large quantities.

It is the general object of my invention to improve the construction of such lathes in certain important respects, to the end that they may be more easily adapted to the forming of articles of different sizes and contours, that the quality of the work produced may be improved, and that the rate of production may be increased.

With this general object in view, important features of my invention relate to the provision of improved means for advancing and retracting the turning tools relative to the work, and to the provision of improved mechanism for taking a finish cut over the articles.

My invention further relates to arrangements and combinations of parts which will be hereinafter set forth and more particularly pointed out in the appended claims.

A preferred form of the invention is shown in the drawings, in which—

Fig. 1 is a front elevation of my improved lathe;

Fig. 2 is a plan view thereof;

Fig. 3 is a detail sectional side elevation, taken substantially along the line 3—3 in Fig. 2;

Fig. 4 is a similar view but showing a different portion of the feed bar;

Fig. 5 is a detail sectional elevation, taken along the line 5—5 in Fig. 3;

Fig. 6 is a sectional end elevation, taken along the line 6—6 in Fig. 1;

Fig. 7 is a sectional front elevation, taken along the line 7—7 in Fig. 2;

Fig. 8 is a sectional end elevation taken along the line 8—8 in Fig. 1;

Fig. 9 is a detail sectional end elevation, taken along the line 9—9 in Fig. 7;

Fig. 10 is a detail front elevation, looking in the direction of the arrow 10 in Fig. 8;

Fig. 11 is an enlarged detail sectional rear elevation, taken along the line 11—11 in Fig. 8;

Fig. 12 is a partial plan view of a finishing knife and a piece of work associated therewith;

Fig. 13 is a diagrammatic view illustrating the relative positions of the different turning and cutting tools;

Fig. 14 is a view similar to Fig. 8, but showing the parts in a different position;

Fig. 15 is a detail view of a partially finished piece of work;

Fig. 16 is a side elevation of a cam plate or templet to be used in producing the work shown in Fig. 15, and Fig. 17 is a plan view of a finishing knife adapted to finish the article shown incomplete in Fig. 15.

Referring to the drawings, I have shown a lathe comprising a bed 20 (Fig. 1) mounted upon legs or supports 21 and having a work-driving spindle 22 mounted in bearings in a head 23 and rotated at high speed by change pulleys 24, driven by a belt 25 from any convenient source of power, not shown.

A work holder 30 (Fig. 1) is rotatably mounted in a sliding cross head 31 and is provided with a square shaft 32 extending through the driving spindle 22. The work holder 30 may thus be moved axially along the frame 20 while retaining its driving connection with the spindle 22.

A drive shaft 35 (Fig. 1) is mounted in bearings in the supports 21 and is driven by a belt 36 and change pulleys 37 at any desired rate of speed. The shaft 35 is connected by a small pulley 38 and belt 39 to a large pulley 40 having a pinion 41 rotatable therewith. The pinion 41 engages a large gear 42 on a cam shaft 43 (Figs. 6 and 7) and the cam shaft is thus rotated at relatively slow speed.

A handle 45 (Fig. 1) is connected through a crankpin 46, link 47 and arm 48 to a belt tightener pulley 49 by which the belt 39 may be tightened to start the cam shaft in rotation when desired.

Cross head feeding mechanism

One end of the work W is seated in a chuck 50 (Fig. 1) on the work holder 30, and the other end of the work projects through a suitable guide, to be described, adjacent the turning and cutting tools.

For feeding the work progressively toward the tools, I have provided a cam 51 (Fig. 7) on the cam shaft 43, which engages a cam roll 58 on a feed bar 59 which is slidably mounted in suitable bearings 60 (Fig. 2) and 61 (Fig. 3) forming part of the frame 20 of the lathe.

A stop 62 (Fig. 3) limits movement of the feed bar to the left, such movement being caused by a heavy spring 63 secured at one end to the frame 20 and at the opposite end to a stud 64 depending from the feed bar 59. A rack bar 66 is adjustably clamped in a groove in the upper face of the feed bar 59 and is provided with notches 67 which may be spaced as desired to correspond to the length of the work to be produced.

A pawl 70 (Fig. 3) is mounted on a rock shaft 71 (Fig. 2) supported in bearings 73 on the cross slide 31. A spring 74 holds the pawl 70 yieldingly in contact with the rack bar 66. An arm 75 (Fig. 1) is mounted on the cross rod 71 and is connected by a link 76 to a hand lever 77 by which the pawl 70 may be raised, when it is desired to return the cross head to its initial position adjacent the spindle head 23.

With this construction, as the cam shaft is slowly rotated, the feed bar 59 and rack bar 66 will draw the cross head 31 gradually toward the cutting tools, thus feeding the work W past the tools. At the end of each stroke, the feed bar will be returned to its initial position as shown in Fig. 3, slipping under the pawl 70 until the pawl engages the next notch 67 in the rack bar 66. The cross head is thus moved progressively toward the cutting tools until the parts reach the position indicated in Fig. 4, in which position there are no further notches 67 to be engaged by the pawl 70 and the feed accordingly ceases.

Forming tool mechanism

As the work is progressively fed toward the right, it is centered in a guide-plate 80 (Figs. 6 and 11) and is engaged by a roughing tool 81 (Fig. 6) clamped to the side of a tool head 82. The roughing tool reduces the work to approximately cylindrical shape, so that it may be fed through an opening 83 (Fig. 11) in the center of the guide-plate 80.

The work is next engaged by a forming tool 85 (Figs. 8 and 14) which is clamped in a tool post 86 secured to a support 87 which is pivoted at 88 to a bracket 89 fixed to the tool head 82. A depending portion 90 of the support 87 engages a cam plate or templet 91 (Fig. 11), clamped in the feed bar 59.

As the feed bar is reciprocated longitudinally, the cam plate 91 is likewise reciprocated under the depending projection 90 of the forming tool support, and the forming tool is thus raised and lowered as the work is fed axially under the tool by the action of the feed bar 59. In that way, the work is very quickly and easily brought to approximately the desired shape.

A cam 95 (Fig. 9) on the cam shaft 43 engages a cam roll 96 on a lever 97 pivoted at 98 on the frame 20. A link 99 is pivoted at 100 (Fig. 8) on the tool support 87 and at its lower end has a slot 101 through which extends a stud 102 in the lever 97.

As the cam shaft 43 rotates, the cam 95 causes the support 87 to be periodically raised, and the support is alternately drawn downward by a heavy spring 103 connected thereto. When the support 87 is raised by the cam 95, the tool 85 is out of engagement with the work and when the support is lowered by the spring 103, its position is governed by the cam plate 91 (Fig. 11) as previously described.

It is at times desirable to swing the support 87 clear of the machine, for changing the tool 85 or for other purposes, and on such occasions the support may be swung upward to the position indicated in Fig. 14, the slot 101 permitting such upward swinging movement and the spring 103 being manually disconnected.

Finishing and cutting-off mechanism

The apparatus thus far described provides for roughing out the stock and for forming an article of approximately the desired shape, as indicated in Fig. 11. I have also provided mechanism of special design for thereafter taking a finishing cut and giving the article its exact finished shape.

For this purpose, I provide a knife 105 (Figs. 2, 8 and 10) clamped in a tool holder 106 (Fig. 10) in which it is secured by binding screws 107. The holder 106 is slidable toward and from the work in a dove-tailed guide-way 108 formed on a stand 109 which in turn is mounted in a guide-way 110 in a frame member 111 extending axially of the lathe.

A link 112 (Fig. 8) is pivoted at one end at 113 to the tool holder 106 and at the opposite end at 114 to an arm 115 extending upwardly from a cam lever 116. A cam roll 117 is mounted on a block 118 which is adjustably secured to the lower end of the lever 116, with the roll 117 positioned in the side groove 119 of a cam 119$^a$ on the cam shaft 43, previously described.

The knife 105 has a width substantially equal to the length of the particular article to be formed and has its cutting edge shaped and contoured to correspond to the desired outline.

In Fig. 12, I have indicated a knife 105$^a$ adapted to finish a handle W′, while in Fig. 17 I have indicated a knife 105$^b$ shaped and contoured to finish a knob or ornament W$^2$ of the general outline shown in Fig. 17. In Fig. 15 I have shown the article W² after the operation of the forming knife thereon, and in Fig. 16 I have shown a cam plate 91ª which would be used to give the forming knife the necessary transverse movement to produce the article shown in Fig. 15.

It will be understood that the cam plates and finishing knives are especially designed for each particular article and that such co-operative design is essential to produce the desired effect. The knives 105 operate below the center of the work, moving substantially tangentially thereunder as indicated in Fig. 13, thus producing a kind of draw cut somewhat similar to a back knife lathe, and providing a very smooth and accurately finished surface on the article produced thereby.

I have also provided a cut-off knife 120 (Figs. 8 and 10) which is preferably mounted for lengthwise and angular adjustment in a clamping device 121 carried by the tool holder 106. As the finishing knife 105 completes its finishing cut, the cut-off knife 120 enters the work and severs the finished article therefrom.

The relative movements of the guides are clearly indicated in Fig. 13, which shows the forming tool 85 as having completed its work and as having been raised to inoperative position by the cam 95. The finishing knife 105ª has also completed its tangential finishing cut below the work W' and the cutting off knife 120 has been thereafter advanced to sever the finished article from the stock W from which it is produced.

Drilling attachment

It is frequently desirable to drill a center hole in the article as it is being formed and for this purpose I have provided a non-rotatable drill spindle 130 (Figs. 1 and 2) slidably mounted in bearings 131 and 132 at the inner end thereof. A spring 134 (Fig. 1) engages a collar 135 on the spindle 130 and acts to yieldingly withdraw the drill from the work.

An arm 138 (Fig. 7) is clamped to the spindle 130 and extends downward therefrom. At its lower end it is provided with a cam roll 139 engaged by a barrel cam 140 on the cam shaft 43. The drill is thus advanced periodically against the end of the rapidly rotating work and thus drills the required hole therein.

An ejector cam 141 on the shaft 43 acts to force the drill positively out of the work, the retracting movement being completed by the spring 134. A collar 142 (Figs. 2 and 7) is clamped on the spindle 130 and engages the bearing 132 to limit rearward movement of the drill.

Operation

Having thus described my invention, the operation and advantages thereof will be readily apparent. My improved lathe may be quickly and easily adapted for the rapid production of duplicate work, merely by inserting a suitable cam plate and rack bar in the feed bar 59, and a finishing knife 105 of the desired outline and contour in the holder 106, and making the necessary axial and transverse adjustments of the tools and slide. The machine will then operate in a semi-automatic manner, it being merely necessary for the operator to return the cross slide 31 to its initial position when a given piece of stock has been used up and to insert a fresh piece of stock in the machine. The machine will then automatically transform the stock into as many finished articles as can be produced therefrom, the feed of the stock automatically ceasing when the notched bar 66 reaches the position indicated in Fig. 4.

Having thus described my invention and the advantages thereof, I do not wish to be limited to the details herein disclosed otherwise than as set forth in the claims, but what I claim is:—

1. In a variety lathe, a bed, a stock feeding cross head mounted for longitudinal movement on said bed, and having a feed bar having a step by step engagement therewith, work forming and finishing tools mounted for successive operation on said stock as it is fed longitudinally of the bed, and means to move said cross head and actuate said tools in synchronized relation comprising a cam shaft having cams thereon effective respectively to engage said feed bar to actuate said cross head and to engage said tools, and said feed bar having a cam thereon effective to move said forming tool toward and from the work, the cam on said cam shaft which controls the forming tool shifting said tool toward and from operative position with relation to the work and with relation to the cam on said feed bar.

2. In a variety lathe, a bed, a stock feeding cross head mounted for longitudinal movement on said bed, and having a feed bar having a step by step engagement therewith, a forming tool, and means to move said cross head and actuate said tool in synchronized relation comprising a cam shaft having cams thereon effective respectively to engage said feed bar to actuate said cross head and to engage said tool, and said feed bar having a cam thereon effective to move said forming tool toward and from the work, the cam on said cam shaft which controls the forming tool shifting said tool toward and from operative position with relation to the work and with relation to the cam on said feed bar.

In testimony whereof I have hereunto affixed my signature.

JOHN J. WITT.